US012048949B2

(12) United States Patent
Ahmad

(10) Patent No.: US 12,048,949 B2
(45) Date of Patent: Jul. 30, 2024

(54) WASTE MANAGEMENT SYSTEM

(71) Applicant: INTELLIA TECHNOLOGY PTE LTD, Singapore (SG)

(72) Inventor: Aqueel Ahmad, Singapore (SG)

(73) Assignee: Intellia Technology PTE LTD, Singapore (SG)

( * ) Notice: Subject to any disclaimer, the term of this patent is extended or adjusted under 35 U.S.C. 154(b) by 0 days.

(21) Appl. No.: 18/021,556

(22) PCT Filed: Dec. 10, 2021

(86) PCT No.: PCT/SG2021/050776

§ 371 (c)(1),
(2) Date: Feb. 16, 2023

(87) PCT Pub. No.: WO2022/124992

PCT Pub. Date: Jun. 16, 2022

(65) Prior Publication Data

US 2023/0311167 A1 Oct. 5, 2023

(30) Foreign Application Priority Data

Dec. 11, 2020 (SG) ........................... 10202012437X

(51) Int. Cl.
*B02C 18/00* (2006.01)
*B02C 23/10* (2006.01)
(Continued)

(52) U.S. Cl.
CPC ........ *B07C 5/3425* (2013.01); *B02C 18/0092* (2013.01); *B02C 23/10* (2013.01);
(Continued)

(58) Field of Classification Search
CPC .................. B07C 5/3425; B07C 5/342; B07C 2501/0054; B02C 18/06; B02C 18/0092;
(Continued)

(56) References Cited

U.S. PATENT DOCUMENTS

| | | | | |
|---|---|---|---|---|
| 5,813,323 A * | 9/1998 | Nowak | B30B 9/3075 | 100/223 |
| 7,562,836 B2 * | 7/2009 | Langston | B07B 13/00 | 241/37.5 |

(Continued)

FOREIGN PATENT DOCUMENTS

| | | |
|---|---|---|
| CN | 204263405 U | 4/2015 |
| CN | 108502403 A | 9/2018 |

(Continued)

*Primary Examiner* — Michael McCullough
*Assistant Examiner* — Jessica L Burkman
(74) *Attorney, Agent, or Firm* — Steven R. Fairchild

(57) ABSTRACT

The present disclosure relates to a waste management system comprising a first waste bin having a first camera operatively configured to a controller. Images of waste captured by the first camera are analyzed by the controller to ensure that the waste is a plastic waste. Further, a categorization mechanism executing at the controller classifies the plastic waste in at least one of a plastic category using a machine learning mechanism. The system comprises a motor for shredding the plastic waste and a sieve for collecting the shredded plastic waste. Containers attached at an end of the sieve receive and store the shredded plastic waste. The system comprises a second waste bin having a second camera for capturing images of the general/wet waste and categorizing the images to alert user about potential food waste. Categorized wet waste is collected in the second bin.

20 Claims, 6 Drawing Sheets

(51) Int. Cl.
*B02C 23/16* (2006.01)
*B07C 5/342* (2006.01)

(52) U.S. Cl.
CPC ........ *B02C 23/16* (2013.01); *B02C 2023/165* (2013.01); *B07C 2501/0054* (2013.01)

(58) Field of Classification Search
CPC ... B02C 2023/165; B02C 23/08; B02C 23/10; B02C 23/12
USPC .......................................................... 209/576
See application file for complete search history.

(56) References Cited

U.S. PATENT DOCUMENTS

| | | | | |
|---|---|---|---|---|
| 7,799,835 | B2 | 9/2010 | Smith | |
| 9,700,896 | B1 | 7/2017 | Gitschel | |
| 2016/0167056 | A1* | 6/2016 | Squartino | B65F 1/0033 241/15 |
| 2018/0016096 | A1 | 1/2018 | Krishnamurthy | |
| 2020/0102440 | A1 | 4/2020 | Yao | |
| 2020/0276617 | A1* | 9/2020 | Torabi | B07C 5/344 |
| 2021/0188541 | A1 | 6/2021 | Kurani | |

FOREIGN PATENT DOCUMENTS

| | | | |
|---|---|---|---|
| CN | 108839980 | A | 11/2018 |
| CN | 209775265 | U | 12/2019 |
| CN | 110789870 | A | 2/2020 |
| KR | 100393525 | B1 | 8/2003 |
| KR | 102222176 | B1 | 3/2021 |

* cited by examiner

WASTE MANAGEMENT SYSTEM

TECHNICAL FIELD

The present disclosure relates to a field of waste management, and more specifically to a system and method for separating plastic waste specifically based on their type.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

In prevalent times pollution caused by plastic waste is a reason for global environmental crisis for many reasons and with each passing day we can notice that the pollution caused by plastic waste is inevitable and continues to grow. In addition, due to the existence of a large variety of plastic polymer types, like Polyethylene terephthalate (PET), High Density Polyethylene (HDPE), Low Density Polyethylene (LDPE), Polypropylene (PP), Polystyrene (PS) etc. there is an increased public confusion on matter of what is recyclable and hence landfills filled with plastic waste is a common sight. Every year millions of tons of plastic waste is dumped into the ocean from ships, polluted beaches, or through rivers and additionally much more is dumped to landfills. Despite being such a useful material only 5-6% of the generated plastic waste is recycled. The biggest reason that more than 90% of plastic is left unused after the first usage is that it is cheaper to produce plastic from crude oil as compared to recycling it from plastic waste. The cycle of plastic recycling is long, complex, tedious, and expensive thus not economically viable. Before it can be recycled, plastic needs to be collected and transported to a sorting facility, where it is separated from other waste material, cleaned, and sorted based on the type. The majority of plastics used in households are in the form of containers, like water bottles, milk, oil, detergent containers, etc. that occupy large volumes but carry a very little weight. So the plastic waste has a high volumetric weight that makes transportation cost high.

To get plastic recycled it needs to be separated from wet and other non-recyclable general waste and must be stored into dedicated recycle bins. If it's dumped with other non-recyclable waste, it is unlikely that it would be recycled. So it requires discipline from users to ensure plastic waste is discarded separately.

It is too cumbersome for most people to separate different types of waste. Even if municipal corporations/town councils provide dedicated plastic recycle bins, not everyone is willing to take the pain to go all the way to the recycling bin to throw just one plastic container. People who are more aware and take recycling seriously, store plastic waste somewhere at home and throw it later in the recycle bin once sufficient plastic waste is collected. But to many, it may not always be feasible due to space constraints and other personal and hygienic reasons. So more often than not plastic waste is thrown away with other non-recyclable general waste.

Further, most of the plastic waste and wet waste generated, for example, at commercial sites, industrial sites, and by residential consumers is not segregated at source and is generally found mixed in trash bins and hence in landfills. The existing pollution generated by mixing of the plastic waste and the wet waste is ubiquitous and is rising at an alarming rate. This mixing of the plastic waste and the wet waste harms the environment and pollutes the food chain. Furthermore, this makes segregation and decomposition of the waste enormously difficult and cumbersome.

There is therefore a need in the art, to be able to help people to segregate the plastic waste from the wet waste while additionally separating the plastic waste based on their plastic type at the source before dumping in the trash bins and subsequently in the landfills. An art that makes it convenient and easy for people to help in plastic recycling without changing their habits as well as help plastic recycling companies to produce high quality recycled plastic that can be used to make the similar objects again from the same plastic so that it can be recycled again and again, thus developing a circular economy for plastics.

SUMMARY OF THE INVENTION

The present disclosure relates to a field of waste management, and more specifically to a system and method for separating plastic waste, at the source, specifically based on their type.

According to an aspect of the present disclosure is provided, a waste management system comprising: a first waste bin, wherein the first waste bin comprises: a first camera that is operatively configured to a controller, wherein one or more images of waste captured by the first camera are analyzed by the controller to ensure that the waste is a plastic waste; and a categorization mechanism executing at the controller classifies the plastic waste in at least one of a plastic category using a machine learning mechanism; a motor for shredding the plastic waste, wherein execution of the motor is based on the at least one of the plastic category in which the plastic waste is classified and wherein an instruction for initiation of the motor attached to a gear, and initiation of power for execution of the motor is received from the controller and wherein the gear is attached to one or more shredding blades; a sieve for collecting the shredded plastic waste, wherein the sieve has one or more holes, and wherein the shredded plastic waste is re-processed using the one or more shredding blades until the shredded plastic waste has a uniform size and passes through the one or more holes; one or more containers attached at an end of the sieve for receiving and storing the shredded plastic waste, wherein each of the one or more containers receive and store the shredded plastic waste associated with the classified plastic waste to be stored in the one or more containers; and a second waste bin, wherein the second waste bin comprises: a second camera that is operatively configured to the controller, wherein one or more images of the waste captured by the second camera are analyzed by the controller to categorize the waste as either a plastic waste or a wet waste; and responsive to the waste being determined as the plastic waste, the categorization mechanism executing at the controller generates an alert, else the waste is collected in the second waste bin and wherein the collected waste is used to determine food wastage statistics.

According to an embodiment of the present invention is provided, a hollow pipe that is attached to the sieve, where a first end of the hollow pipe receives the shredded plastic waste dropped from the sieve and wherein a second end of the hollow pipe comprises a flexible component that is configured to the motor for moving the hollow pipe over a metallic rod for dropping the received shredded plastic waste into the one or more containers associated with the classified plastic waste and wherein the metallic rod is stretched over each of the one or more containers.

According to an embodiment of the present invention, the flexible component comprises one or more sensors for determining a fill level of the one or more containers receiving the shredded plastic waste.

According to an embodiment of the present invention, the one or more sensors are at least one of an ultrasonic sensor, a LiDAR (Light Detection and Ranging) sensor and a RADAR (Radio Detection and Ranging) sensor.

According to an embodiment of the present invention, movement of the flexible component is calibrated to move, stop and place the second end of the hollow pipe accurately above the one or more containers associated with the classified plastic waste.

According to an embodiment of the present invention, is provided a display screen for generating a message based on the fill level of the one or more containers above a threshold level.

According to an embodiment of the present invention, the alert is at least one of a visual alert, a vibration alert and a sound alert.

According to an embodiment of the present invention, the sieve is made up of any of steel, plastic and copper.

According to an embodiment of the present invention, a unique weight sensor is installed at each of a platform holding each of the one or more containers and wherein each of the weight sensor implements, operates, detects, measures, and monitors a waste weight present in each of the corresponding one or more containers.

According to an embodiment of the present invention, the weight sensor sends information related to the waste weight through a wireless network to the remote server.

According to an embodiment of the present invention, the platform holding the one or more containers is configured to be rotated on receiving instructions from the controller, wherein upon rotation of the platform each of the one or more containers rotate to receive the shredded plastic waste associated with the classified plastic waste to be stored in the one or more containers.

According to an embodiment of the present invention is disclosed a method of managing waste. The method comprises: capturing one or more images of waste captured at a first waste bin by a first camera and analyzing the captured one or more images by a controller to ensure that the waste is a plastic waste; executing a categorization mechanism at the controller for classifying the plastic waste in at least one of a plastic category using a machine learning mechanism; executing a motor for shredding the plastic waste, wherein the execution of the motor is based on the at least one of the plastic category in which the plastic waste is classified and wherein an instruction for initiation of the motor attached to a gear, and initiation of power for execution of the motor is received from the controller and wherein the gear is attached to one or more shredding blades; collecting the shredded plastic waste using a sieve, wherein the sieve has one or more holes, and wherein the shredded plastic waste is re-processed using the one or more shredding blades until the shredded plastic waste has a uniform size and passes through the one or more holes; receiving and storing the shredded plastic waste in one or more containers attached at an end of the sieve, wherein each of the one or more containers receive and store the shredded plastic waste associated with the classified plastic waste to be stored in the one or more containers; and capturing one or more images of waste captured at a second waste bin by a second camera and analyzing the captured one or more images by the controller to categorize the waste as either a plastic waste or a wet waste, in response to the waste being determined as the plastic waste generating an alert by the categorization mechanism, executing at the controller, else collecting the waste in the second storage bin and wherein the collected waste is used to determine food wastage statistics.

BRIEF DESCRIPTION OF ACCOMPANYING DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

The diagrams are for illustration only, which thus is not a limitation of the present disclosure, and wherein.

Figure 3:
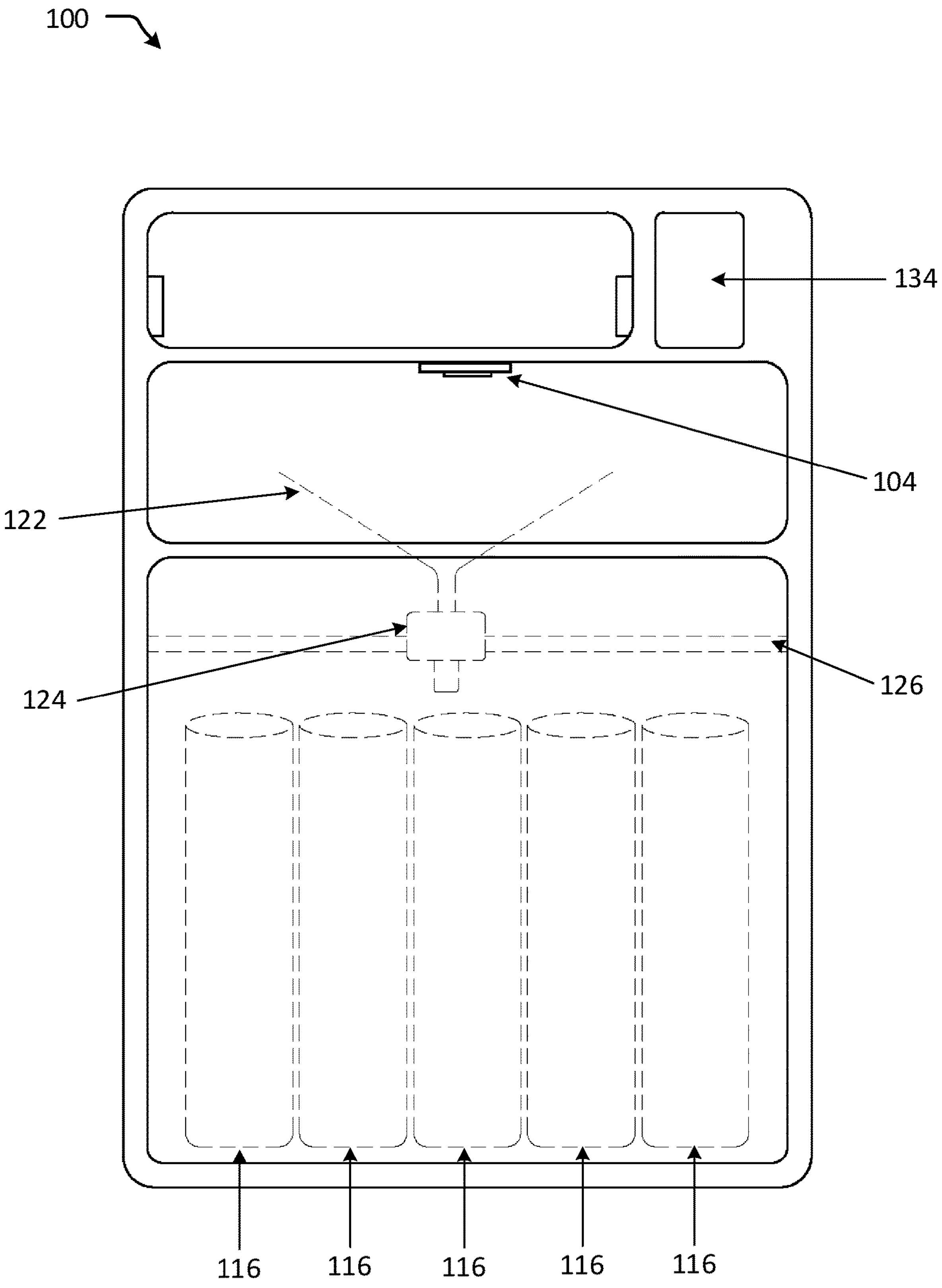
Figure 4:
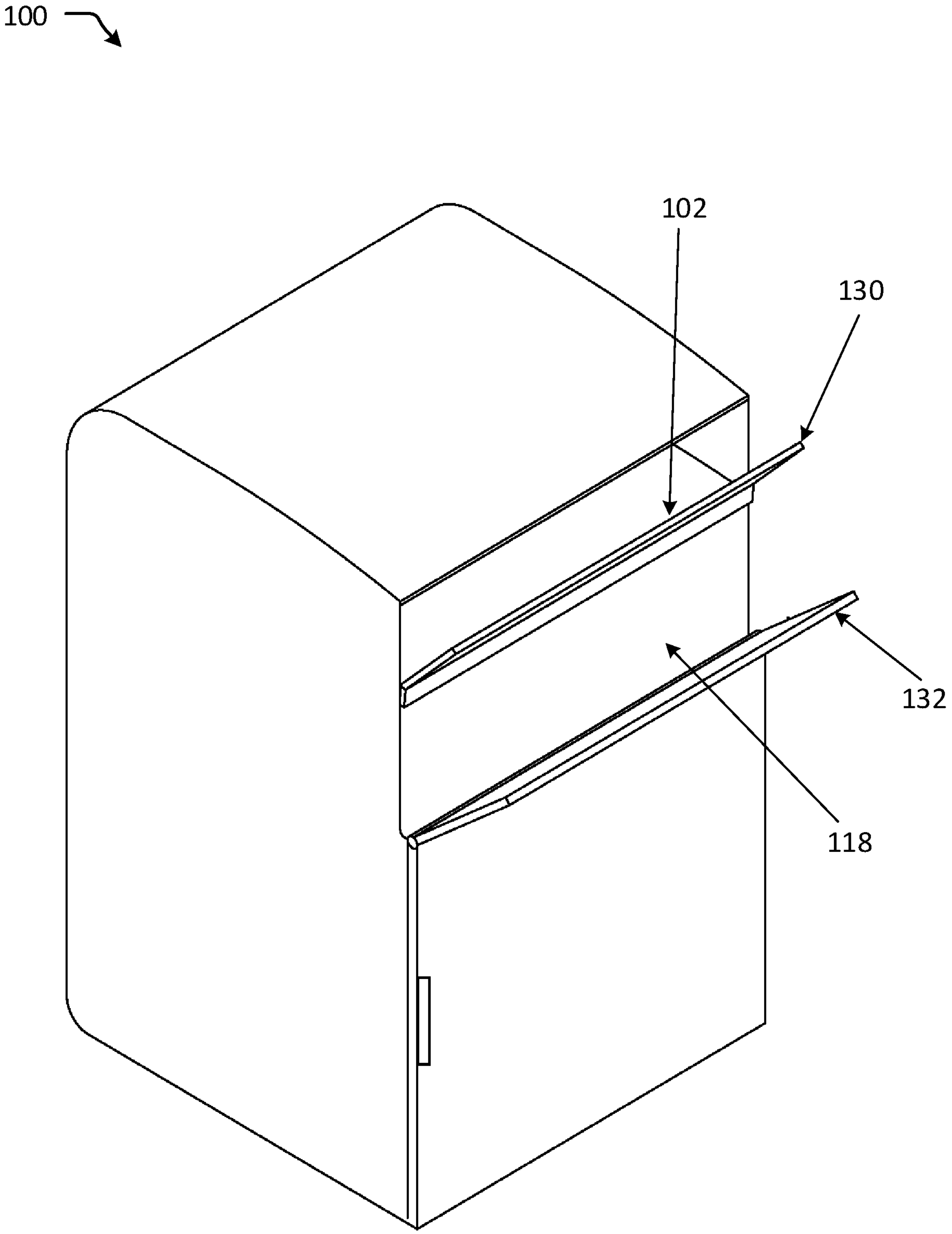

FIG. 3 illustrates a perspective view of the first storage bin of the waste management system, in accordance with an embodiment of the present disclosure FIG. 4 illustrates a front view of a latch of an entry point of the first storage bin and a front view of a latch of an entry point of the second storage bin of the waste management system, in accordance with an embodiment of the present disclosure.

Figure 5:
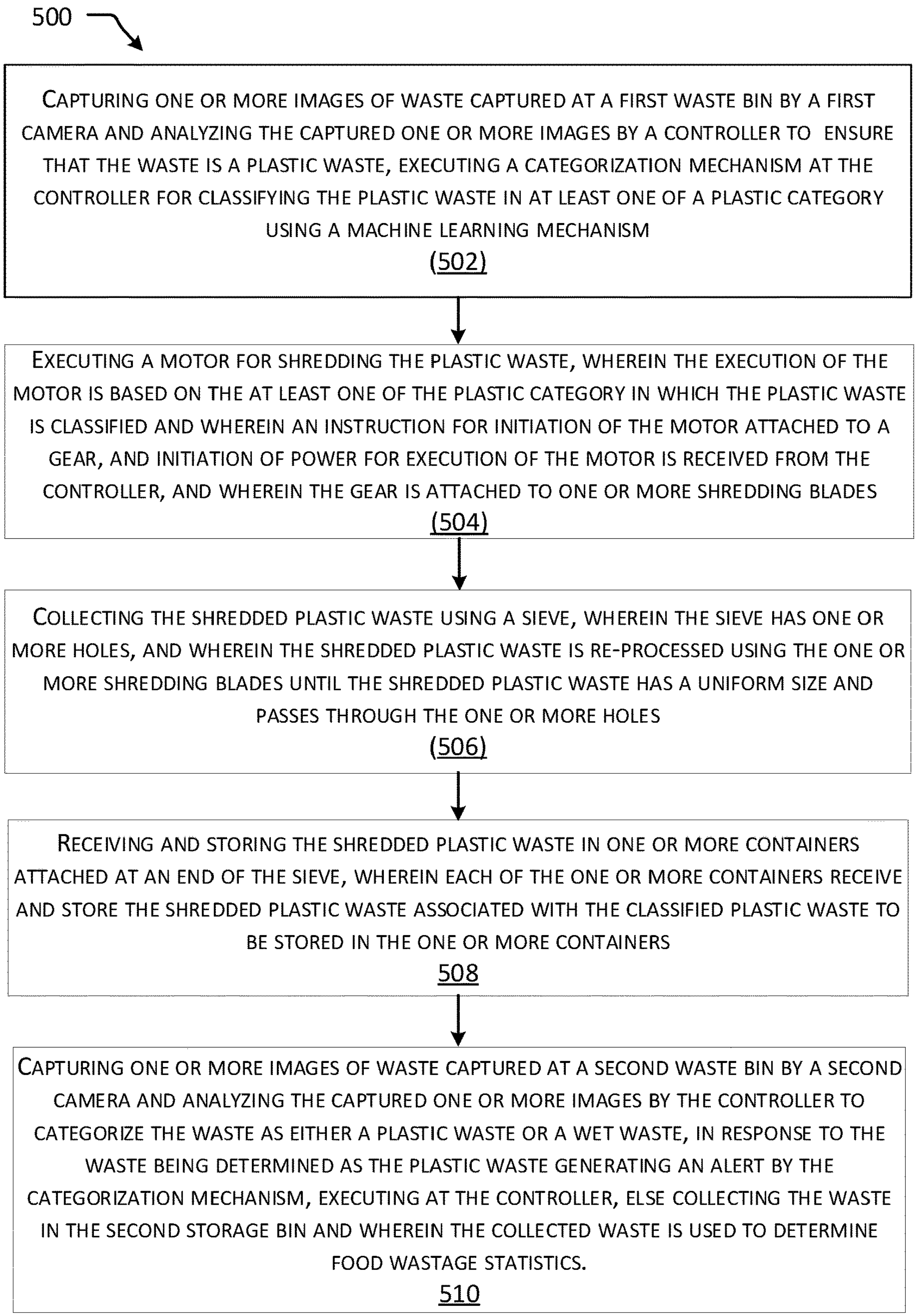

FIG. 5 illustrates a process flow diagram for managing the waste, in accordance with an embodiment of the present disclosure.

DETAILED DESCRIPTION OF THE INVENTION

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

If the specification states a component or feature "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. This disclosure may however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Various terms as used herein are shown below. To the extent a term used in a claim is not defined below, it should be given the broadest definition persons in the pertinent art have given that term as reflected in printed publications and issued patents at the time of filing.

In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

The present disclosure relates a system and method for separating plastic waste, at the source, specifically based on their type. Embodiments disclosed herein comprise a waste management system that may be used to collect waste and general trash from households, restaurants and other public places. More particularly, the embodiments described herein provide an improved version of a trash bin or a recycle bin that is smart, connected to cloud and has an associated companion application. The system may have one or more bins for maintaining different types of trash. One bin may be dedicated to storing plastic, and another one may be dedicated to storing other recyclable trash like wet kitchen waste and other general trash etc. The bin dedicated to storing waste like plastic may have a shredding mechanism to shred the plastic, based on the type of plastic, to make it compact. The shredding thus significantly reduces the volume of the plastic for storage up to 90%. Due to shredding of the plastic waste one-month worth of plastic can easily be stored in the bin. This compact storage also reduces the transportation cost and significantly reduces volumetric weight of the plastic waste.

Figure 1:
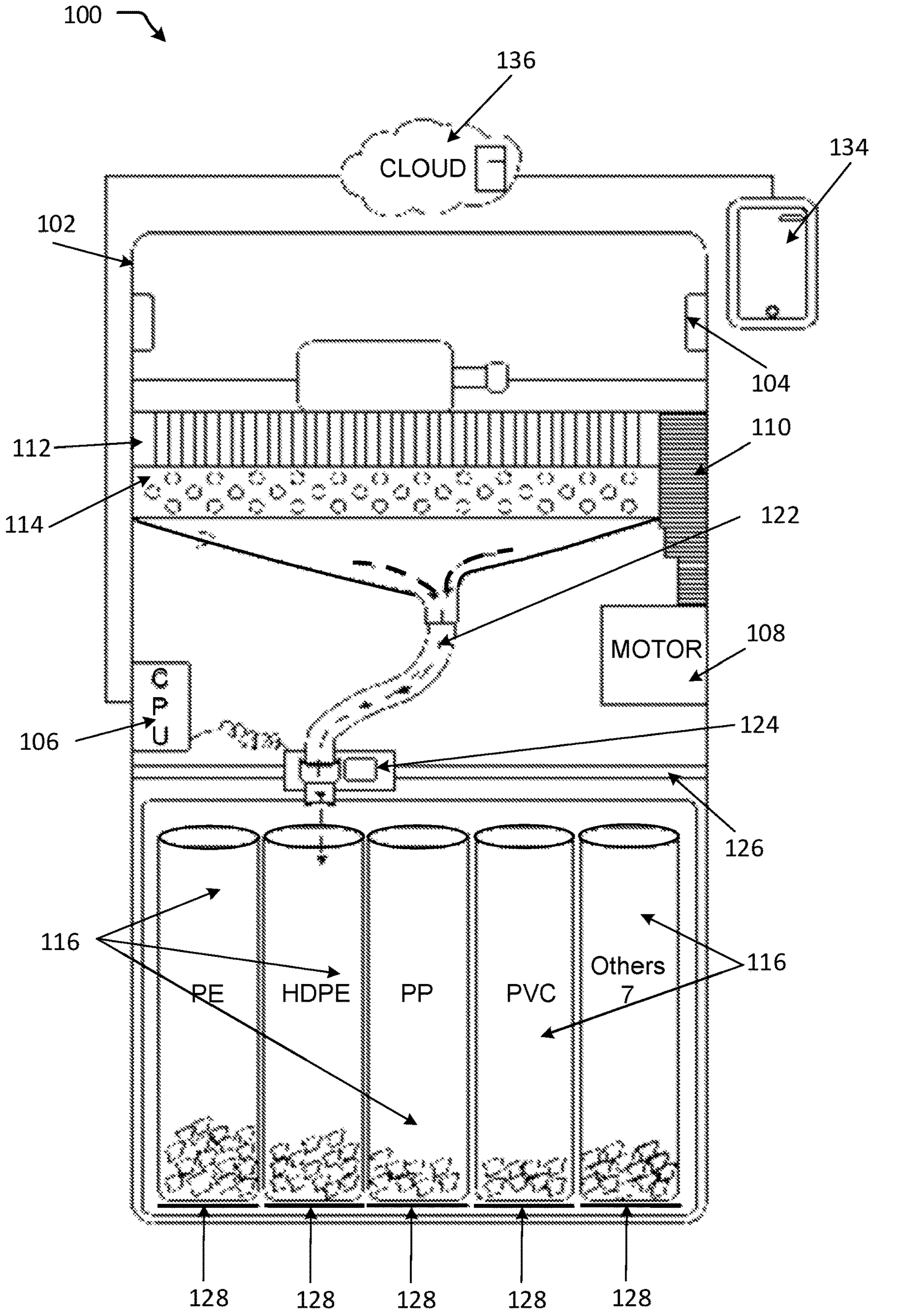
FIG. 1 illustrates a front view of a waste management system, in accordance with an embodiment of the present disclosure.

FIG. 1 illustrates a front view of a waste management system (100), in accordance with an embodiment of the present disclosure. With reference to FIG. 1, the waste management system (100) includes a first waste bin (102). The first waste bin (102) includes a first camera (104) that is operatively configured to a controller (106). The first camera (104) captures one or more images of waste. The captured images may be either a 2Dimensional (2D) or a 3Dimensional (3D) image. The images are analyzed by the controller (106) to ensure that the waste is a plastic waste. The controller (106) may be either a Central Processing Unit (CPU) or a Microcontroller present in the system 100.

In an embodiment, the camera may have an associated Near Infrared (NIR) sensor for determining and recording the type of plastic that is being trashed. Based on analysis as performed by either the CPU or the remote server (136) using NIR sensor data, the plastic is categorized as any of the said type polyethylene terephthalate (PET) type, High Density Poly Ethylene (HDPE) type, low density polyethylene (LDPE) type, Polypropylene (PP) type, Polystyrene (PS) type or other type.

In an embodiment, for further categorization of the plastic waste, the controller (106) uses a categorization mechanism. The categorization mechanism is used to classify the plastic waste in at least one of a plastic category using a machine learning mechanism, for example, AI (Artificial Intelligence) related mechanisms. Further, 2Dimensional (2D) and 3D methods in image processing may be used and an image analysis software may be trained using deep learning algorithms to recognize, distinguish and categorize the plastic waste in the at least one of the plastic category.

The waste management system (100) includes a motor (108) for shredding the plastic waste. Execution of the motor (108) is based on at least one of the plastic category in which the plastic waste is classified. Further, an instruction for initiation of the motor that is attached to a gear (110) and for initiation of power for execution of the motor (108) is received from the controller (106). The gear (110) is attached to one or more shredding blades (112). As may be appreciated, the shredding blades (112) may be at least a type of blade and may be, for example, shear shredder, chipper, granulator, grinder, etc. The shredding blades (112) may act to shear and breakdown the plastic even further using varying rotation rates, depending upon the types of blades used, creating very high shear torque that cut and rip hard plastic objects to smaller pieces.

In an embodiment, the waste management system (100) includes a sieve (114) (also known as filters) for collecting and filtering the shredded plastic waste. The sieve (114) has one or more holes of a uniform diameter. Dimension of the one or more holes of the sieve (114) allows for selecting size of the shredded plastic to be filtered. The one or more holes may be of, for example, a 5-mm size that may be used to remove bigger plastic particles, or of, for example, 1 mm-0.5 mm size that may be used to remove plastic particles of smaller size. In an embodiment, the sieve (114) is made up of, for example, any of steel, plastic and copper material. The shredded plastic waste is re-processed using the one or more shredding blades (112) until the shredded plastic waste has a uniform size and passes through the one or more holes.

In an embodiment, the waste management system (100) includes one or more containers (116) that are attached at an end of the sieve (114). The one or more containers (116) receive and store the shredded plastic waste. Each of the one or more containers (116) receives and store the shredded plastic waste associated with the classified plastic waste to be stored in the one or more containers (116).

In another embodiment, the waste management system (100) includes a second waste bin (118). The second waste bin (118) includes a second camera (120) that is operatively configured to the controller (106). One or more images of the waste captured by the second camera (120) are analyzed at the controller (106) to categorize the waste as either a plastic waste or a wet waste. If the waste is determined as the plastic waste, the categorization mechanism executing at the controller (106) generates an alert. However, if the waste is determined as the wet waste, the waste is collected in the second waste bin (118) and is used to determine food wastage statistics. The alert is at least one of a visual alert, a vibration alert and a sound alert.

In an embodiment, the waste management system (100) includes a hollow pipe (122) that is attached to the sieve (114). The hollow pipe (122) may be flexible for easy movement. A first end of the hollow pipe (122) receives the shredded plastic waste dropped from the sieve (114). A second end of the hollow pipe (122) includes a flexible component (124) that is configured to the motor (108) for moving the hollow pipe (122) over a metallic rod (126) for dropping the received shredded plastic waste into the one or more containers (116) associated with the classified plastic waste so that shredded plastic of different types is not mixed together. As may be appreciated during the movement, the metallic rod (126) is stretched over each of the one or more containers (116). The flexible component (124) comprises one or more sensors for determining a fill level of the one or more containers receiving the shredded plastic waste. The one or more sensors are at least one of an ultrasonic sensor, a LiDAR (Light Detection and Ranging) sensor and a RADAR (Radio Detection and Ranging) sensor. Further, the waste management system (100) comprises a display screen (134) for generating a message based on the fill level of the one or more containers above a threshold level. The display screen (134) may be of, for example, a CRT (Cathode Ray Tube) type, LCD (Liquid Crystal Display) type, LED (Light Emitting Diodes) type, etc. As may be appreciated the display screen (134) may be that of an associated device such as a mobile phone, a laptop and the like. In an embodiment, the display screen (134) may be embedded with the system (100) or may be attached from an external location and operatively configured to display the message.

In an embodiment, when the fill level of the one or more containers (116) reaches a threshold level, the shredding of the plastic is halted and an alert message for emptying the one or more containers (116) is displayed on the display screen (134).

In an embodiment, movement of the flexible component (124) is calibrated to move, stop and place the second end of the hollow pipe (122) accurately above the one or more containers (116) associated with the classified plastic waste for accurate disposal of the plastic waste in the one or more designated containers (116).

In an embodiment, a unique weight sensor (128) is installed at each of a platform holding each of the one or more containers (116). Each of the weight sensors implements, operates, detects, measures, and monitors a waste weight present in each of the corresponding one or more containers (116). The weight sensor (128) may send information related to the waste weight through a wireless network to the remote server (136). The remote server (136) may be maintained in the cloud. The cloud server is a virtual server (rather than a physical server) running in a cloud computing environment and is built, hosted and delivered via a cloud computing platform via the internet, and can be accessed remotely. In an implementation, the wireless network may be implemented as one of the different types of networks, such as the internet, Wi-Fi, LTE network, CDMA network, and the like. Further, the wireless network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the wireless network may include a variety of network devices, including routers, bridges, servers, computing devices, storage devices, and the like. In an another embodiment, the platform holding the one or more containers (116) is configured to be rotated on receiving instructions from the controller (106), wherein upon rotation of the platform each of the one or more containers (116) rotate to receive the shredded plastic waste associated with the classified plastic waste to be stored in the one or more containers (116).

Figure 2A:
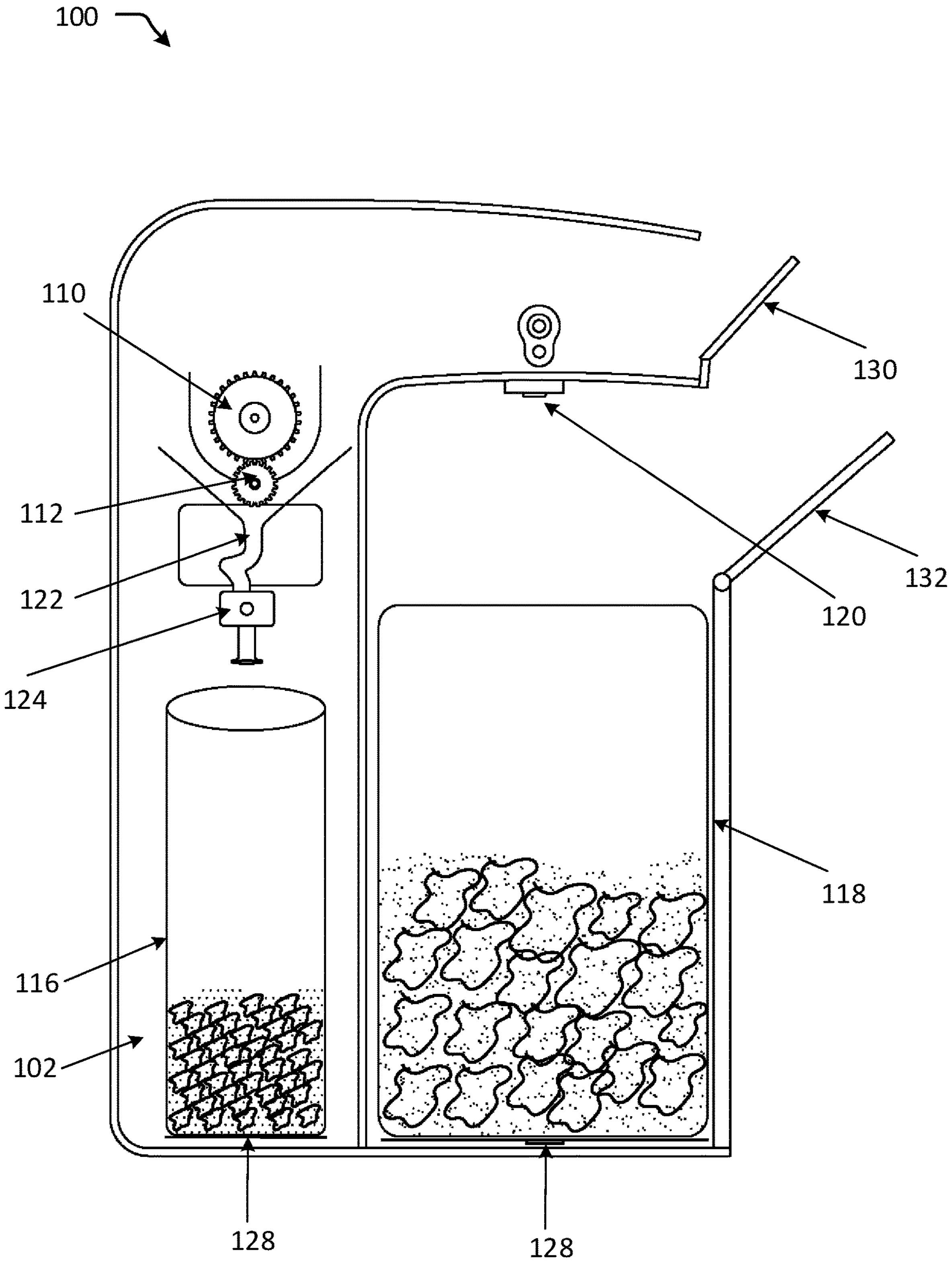
FIGS. 2A and 2B illustrate a front view and a side-by-side view respectively of the waste management system comprising the first waste bin and the second waste bin, in accordance with an embodiment of the present disclosure.
Figure 2B:
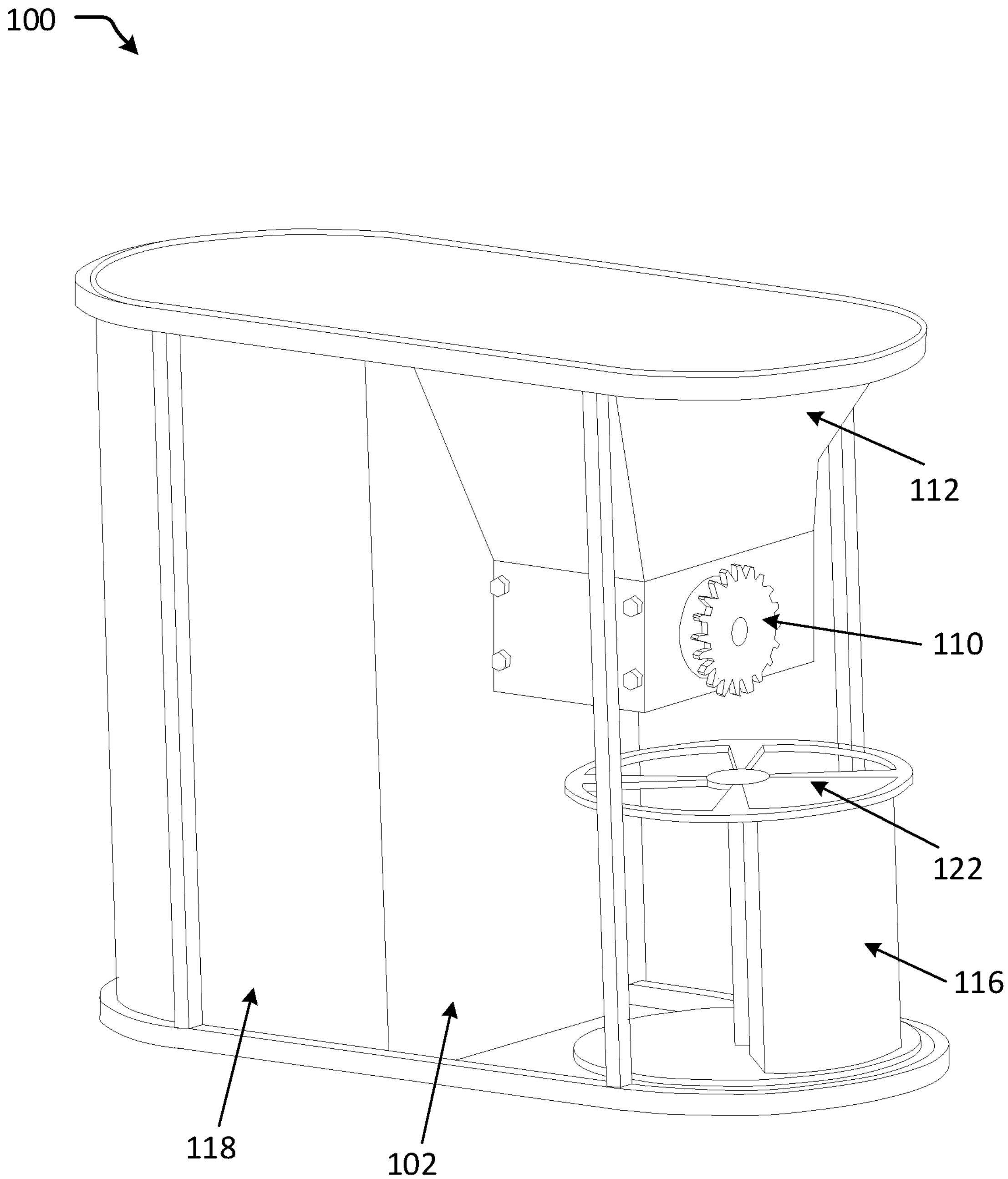

FIGS. 2A and 2B illustrate a front view and a side-by-side view respectively of the waste management system (100) comprising the first waste bin (102) and the second waste bin (118), in accordance with an embodiment of the present disclosure.

With reference to FIG. 2A is shown an inlet trap (130) for disposing off the waste in the first waste bin (102). As illustrated, the first waste bin (102) includes a motor for shredding the categorized plastic waste. Execution of the motor is based on at least one of the plastic categories in which the plastic waste is classified. An instruction for initiation of the motor attached to a gear (110) and of power for execution of the motor is received from a controller (106). The gear (110) is attached to one or more shredding blades (112). Further, as illustrated is a hollow pipe (122) that is attached to a sieve. A first end of the hollow pipe (122) receives the shredded plastic waste dropped from the sieve. A second end of the hollow pipe (122) comprises a flexible component (124) that is configured to the motor for moving the hollow pipe (122) over a metallic rod for dropping the received shredded plastic waste into the one or more containers (116) associated with the classified plastic waste.

Further, as is shown in FIG. 2A is an inlet trap (132) for receiving wet waste in a second waste bin (118). The second waste bin (118) includes a second camera (120) that is operatively configured to a controller (106) for analyzing one or more images of the waste thrown through the inlet trap (132). The one or more images captured by the second camera (120) are analyzed at the controller (106) to categorize the waste as either a plastic waste or a wet waste.

Further, a unique weight sensor (128) is installed at each of a platform holding each of the one or more containers (116). Each of the weight sensor (128) (also referred to herein as load sensor) implements, operates, detects, measures, and monitors a waste weight present in each of the corresponding one or more containers (116). In an embodiment, the weight sensor (128) sends information related to the waste weight through a wireless network to the remote server (136). In an exemplary scenario, information related to the waste weight corresponds to the one or more containers (116) being full beyond capacity and unable to hold any additional waste. In another exemplary scenario, the information related to the waste weight corresponds to weight of the waste reaching a threshold level such that the one or more containers (116) need to be emptied for receiving any additional shredded plastic waste. With respect to the mentioned exemplary scenarios when at least one of a container of the one or more of the containers (116) is being emptied, remaining other containers of the one or more of the containers (116) may be filled with the shredded plastic of an associated type.

Every time one or more containers (116) are cleared, the unique weight sensor (128) determines and records the amount of plastic cleared. The records of the amount of plastic cleared is maintained at the remote server pertaining to an amount of plastic the user has already recycled. Further, the remote server may notify the user at some interval how much plastic they have helped to recycle to keep them motivated. The user may also check an amount of plastic recycled by him/her using an application running on an associated user device. The user device may be a laptop, a mobile phone, and the like.

Not all plastics are the same and not all plastic types are recyclable. Hence, it is essential during plastic recycling that plastics of different polymer types are separated. Mixing different polymer types of plastics makes it non-recyclable. Similarly it is important to identify non-recyclable plastic, even though it cannot be recycled but it should not be dumped into landfills or the ocean. To protect the environment it is imperative to not let the plastic slip out of the waste management system. Non-recyclable plastic should be collected and be incinerated although it is not very good for the environment but it is better than leaving plastic out in the environment. The system may also include one container that is dedicated to non-recyclable plastics and may be used to store plastic types that cannot be detected by the system.

FIG. 2B illustrate the side view of the waste management system comprising the first waste bin (102) and the second waste bin (118). The first waste bin (102) includes the hollow pipe (122) attached at the receiving end of the one or more containers (116), the gear (110) and the embedded one or more shredding blades (112). In an embodiment, each of the platforms holding the one or more containers (116) is configured to be rotated on receiving instructions from the controller (106). Upon rotation of each of the platform, each of the one or more containers (116) rotate respectively to receive the shredded plastic waste associated with the classified plastic waste to be stored in the one or more containers (116). Instructions for rotation of each of the one or more platform may be generated by the motor. The motor may receive instructions from the controller (106). As may be appreciated, the sieve may release the plastic waste being shredded only when the container that qualifies to receive the classified plastic waste is present directly below the shredder, else the sieve may not release the shredded classified plastic waste.

FIG. 3 illustrates a perspective view of the first waste bin (102) of the waste management system (100), in accordance with an embodiment of the present disclosure. With reference to FIG. 3 is illustrated a display screen (134) configured with the system (100). The display screen may be operatively configured with the remote server (136) or may be connected to the controller (106). Also, it illustrates the first camera (104) that is used to capture one or more images of waste and classify the same as the plastic waste or the wet waste. The perspective view also displays a hollow pipe (122) that is attached to a sieve. A first end of the hollow pipe (122) receives the shredded plastic waste dropped from the sieve. A second end of the hollow pipe (122) comprises a flexible component (124) that is configured to motor for moving the hollow pipe (122) over a metallic rod (126) for dropping the received shredded plastic waste into the one or more containers (116) associated with the classified plastic waste. The metallic rod (126) is stretched over each of the one or more containers (116).

FIG. 4 illustrates a front view of a latch of an entry point of the first waste bin (102) and a front view of a latch of an entry point of the second waste bin (118) of the waste management system (100), in accordance with an embodiment of the present disclosure. Each of the latch of the first waste bin (102) and that of the second waste bin (118) may be made of either plastic material or metal material. The latch may be flexible to be opened by the user for throwing the plastic and the wet waste. As discussed above, each of the latches may have an associated first camera and second camera for determining and classifying the waste thrown as either the wet waste or the plastic waste.

FIG. 5 illustrates a process flow diagram (500) for managing waste, in accordance with an embodiment of the present disclosure. At step 502, one or more images of waste captured at a first waste bin are captured by a first camera. A controller analyzes the one or more images to ensure that the waste is a plastic waste. Further, a categorization mechanism is executed at the controller for classifying the plastic waste in at least one of a plastic category using a machine learning mechanism.

Further, at step 504, a motor for shredding the plastic waste is executed. The execution of the motor is based on the at least one of the plastic category in which the plastic waste is classified. Further, an instruction for initiation of the motor attached to a gear, and initiation of power for execution of the motor is received from the controller. The gear is attached to one or more shredding blades. At step 506, the shredded plastic waste is collected using a sieve having one or more holes. The shredded plastic waste is re-processed using the one or more shredding blades until the shredded plastic waste has a uniform size and passes through the one or more holes.

At step 508, the shredded plastic waste is received and stored in one or more containers attached at an end of the sieve. Further, at step, 510 one or more images of waste are captured at a second waste bin by a second camera. The captured one or more images may be analyzed by the controller to categorize the waste as either a plastic waste or a wet waste. In response to the waste being determined as the plastic waste an alert is generated by the categorization mechanism, executing at the controller. Otherwise, the waste in the second storage bin is collected and the collected waste is used to determine food wastage statistics.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A waste management system (100) comprising:

a first waste bin (102), wherein the first waste bin (102) comprises:

a first camera (104) that is operatively configured to a controller (106), wherein one or more images of waste captured by the first camera (104) are analyzed by the controller (106) to ensure that the waste is a plastic waste, and wherein a categorization mechanism executing at the controller (106) classifies the plastic waste in at least one of a plastic category using a machine learning mechanism;

a motor (108) for shredding the plastic waste, wherein execution of the motor (108) is based on the at least one of the plastic category in which the plastic waste is classified and wherein an instruction for initiation of the motor attached to a gear (110), and initiation of power for execution of the motor (108) is received from the controller (106) and wherein the gear (110) is attached to one or more shredding blades (112);

a sieve (114) for collecting the shredded plastic waste, wherein the sieve (114) has one or more holes, and wherein the shredded plastic waste is reprocessed using the one or more shredding blades (112) until the shredded plastic waste has a uniform size and passes through the one or more holes;

one or more containers (116) attached at an end of the sieve (114) for receiving and storing the shredded plastic waste, wherein each of the one or more containers (116) receive and store the shredded plastic waste associated with the classified plastic waste to be stored in the one or more containers (116); and a second waste bin (118), wherein the second waste bin (118) comprises:

a second camera (120) that is operatively configured to the controller (106), wherein one or more images of the waste captured by the second camera (120) are analyzed by the controller (106) to categorize the waste as either a plastic waste or a wet waste, responsive to the waste being determined as the plastic waste, the categorization mechanism executing at the controller (106) generates an alert, else the waste is collected in the second waste bin (118) and wherein the collected waste is used to determine food wastage statistics.

2. The waste management system (100) of claim 1, further comprises:

a hollow pipe (122) that is attached to the sieve (114), where a first end of the hollow pipe (122) receives the shredded plastic waste dropped from the sieve (114) and wherein a second end of the hollow pipe (122) comprises a flexible component (124) that is configured to the motor (108) for moving the hollow pipe (122) over a metallic rod (126) for dropping the received shredded plastic waste into the one or more containers (116) associated with the classified plastic waste and wherein the metallic rod (126) is stretched over each of the one or more containers (116).

3. The waste management system (100) of claim 2, wherein movement of the flexible component (124) is calibrated to move, stop and place the second end of the hollow pipe (122) accurately above the one or more containers (116) associated with the classified plastic waste.

4. The waste management system (100) of claim 2, wherein the flexible component (124) comprises one or more sensors for determining a fill level of the one or more containers receiving the shredded plastic waste.

5. The waste management system (100) of claim 4, wherein the one or more sensors are at least one of an ultrasonic sensor, a LiDAR (Light Detection and Ranging) sensor and a RADAR (Radio Detection And Ranging) sensor.

6. The waste management system (100) of claim 1, further comprises a display screen (134) for generating a message based on the fill level of the one or more containers above a threshold level.

7. The waste management system (100) of claim 1, wherein the alert is at least one of a visual alert, a vibration alert and a sound alert.

8. The waste management system (100) of claim 1, wherein the sieve (114) is made up of any of steel, plastic and copper.

9. The waste management system (100) of claim 1, wherein a weight sensor (128) is installed at each of a platform holding each of the one or more containers and wherein each of the weight sensor detects a waste weight present in each of the corresponding one or more containers (116).

10. The waste management system (100) of claim 9, wherein the weight sensor (128) sends information related to the waste weight through a wireless network to a remote server (136).

11. The waste management system (100) of claim 9, wherein each of the platform holding the one or more containers (116) is configured to be rotated on receiving instructions from the controller (106), wherein upon rotation of each of the platform, each of the one or more containers (116) rotate respectively to receive the shredded plastic waste associated with the classified plastic waste to be stored in the one or more containers (116).

12. A method (200) of managing waste, the method comprising:

capturing one or more images of waste captured at a first waste bin by a first camera and analyzing the captured one or more images by a controller to ensure that the waste is a plastic waste, executing a categorization mechanism at the controller for classifying the plastic waste in at least one of a plastic category using a machine learning mechanism;

executing a motor for shredding the plastic waste, wherein the execution of the motor is based on the at least one of the plastic category in which the plastic waste is classified and wherein an instruction for initiation of the motor attached to a gear, and initiation of power for execution of the motor is received from the controller and wherein the gear is attached to one or more shredding blades;

collecting the shredded plastic waste using a sieve, wherein the sieve has one or more holes, and wherein the shredded plastic waste is re-processed using the one or more shredding blades until the shredded plastic waste has a uniform size and passes through the one or more holes;

receiving and storing the shredded plastic waste in one or more containers attached at an end of the sieve, wherein each of the one or more containers receive and store the shredded plastic waste associated with the classified plastic waste to be stored in the one or more containers; and capturing one or more images of waste captured at a second waste bin by a second camera and analyzing the captured one or more images by the controller to categorize the waste as either a plastic waste or a wet waste, in response to the waste being determined as the plastic waste generating an alert by the categorization mechanism, executing at the controller, else collecting the waste in the second storage bin and wherein the collected waste is used to determine food wastage statistics.

13. The method (200) of claim 12, further comprising:

attaching a hollow pipe to the sieve, where a first end of the hollow pipe receives the shredded plastic waste dropped from the sieve and wherein a second end of the hollow pipe comprises a flexible component that is configured to the motor for moving the hollow pipe over a metallic rod for dropping the received shredded plastic waste into the one or more containers associated with the classified plastic waste and wherein the metallic rod is stretched over each of the one or more containers.

14. The method (200) of claim 13, further comprising:

calibrating movement of the flexible component to move, stop and place the second end of the hollow pipe accurately above the one or more containers associated with the classified plastic waste.

15. The method (200) of claim 13, wherein the flexible component comprises:

determining a fill level of the one or more containers receiving the shredded plastic waste using one or more sensors.

16. The method (200) of claim 15, wherein the one or more sensors are at least one of an ultrasonic sensor, a LiDAR (Light Detection and Ranging) sensor and a RADAR (Radio Detection And Ranging) sensor.

17. The method (200) of claim 12, further comprising:

generating a message based on the fill level of the one or more containers above a threshold level using a display screen.

18. The method (200) of claim 12, wherein the alert is at least one of a visual alert, a vibration alert and a sound alert.

19. The method (200) of claim 12, wherein the sieve is made up of any of a steel material, a plastic material and a copper material.

20. The method (200) of claim 12, wherein the method further comprises:

installing a weight sensor at each of a platform holding each of the one or more containers and wherein each of the weight sensor detects a waste weight present in each of the one or more containers.

* * * * *